US00RE49356E

(19) United States
(12) Reissued Patent
Hsu et al.

(10) Patent Number: US RE49,356 E
(45) Date of Reissued Patent: Jan. 3, 2023

(54) CONTROL METHOD AND CONTROL DEVICE FOR CHARGING TIME SHARING

(71) Applicant: NOVATEK Microelectronics Corp., Hsin-Chu (TW)

(72) Inventors: Chin-Hung Hsu, Taoyuan (TW); Han-Ying Chang, Hsinchu (TW); Yu-Shiuan Shen, Taipei (TW)

(73) Assignee: NOVATEK Microelectronics Corp., Hsin-Chu (TW)

(21) Appl. No.: 17/020,791

(22) Filed: Sep. 14, 2020

Related U.S. Patent Documents

Reissue of:
(64) Patent No.: 10,403,224
Issued: Sep. 3, 2019
Appl. No.: 15/233,943
Filed: Aug. 10, 2016

(51) Int. Cl.
*G09G 3/36* (2006.01)

(52) U.S. Cl.
CPC ..... *G09G 3/3685* (2013.01); *G09G 3/3607* (2013.01); *G09G 3/3648* (2013.01); *G09G 3/3674* (2013.01); *G09G 2310/0202* (2013.01); *G09G 2310/08* (2013.01)

(58) Field of Classification Search
CPC combination set(s) only.
See application file for complete search history.

(56) References Cited

U.S. PATENT DOCUMENTS 6,661,428 B1 * 12/2003 Kim ..... G09G 3/20 345/204
8,912,994 B2 * 12/2014 Liu ..... G09G 3/36 345/99
2005/0110739 A1 * 5/2005 Kwon ..... G09G 3/3648 345/100
2005/0195671 A1 * 9/2005 Taguchi ..... G02F 1/13306 365/203
2006/0290644 A1 * 12/2006 Kim ..... G09G 3/3677 345/100
2010/0164966 A1 * 7/2010 Sakariya ..... G09G 5/18 345/520
2011/0122106 A1 * 5/2011 Li ..... G09G 3/3648 345/205

(Continued)

FOREIGN PATENT DOCUMENTS

CN 1989542 A 6/2007
CN 101206844 A 6/2008

(Continued)

*Primary Examiner* — Dennis G Bonshock
(74) *Attorney, Agent, or Firm* — Winston Hsu

(57) ABSTRACT

A control method for charging time sharing in a display apparatus, which includes receiving image data including a plurality of pixel data signals corresponding to a plurality of display driving periods, each display driving period associated with pixel data signals of a respective row of the display apparatus, calculating a plurality of gray variations corresponding to the plurality of display driving periods according to the plurality of pixel data signals, adjusting the plurality of display driving periods to generate a plurality of adjusted display driving periods according to the plurality of gray variations, and generating a gate clock signal according to the plurality of adjusted display driving periods.

30 Claims, 5 Drawing Sheets

(56) References Cited

U.S. PATENT DOCUMENTS

| | | | | |
|---|---|---|---|---|
| 2012/0194497 | A1* | 8/2012 | Wu | G09G 3/3677 345/211 |
| 2014/0253525 | A1* | 9/2014 | Munechika | G06F 3/04166 345/204 |
| 2014/0267467 | A1* | 9/2014 | Huang | G09G 3/3611 345/691 |
| 2015/0091783 | A1* | 4/2015 | Hwang | G11C 19/28 345/55 |

FOREIGN PATENT DOCUMENTS

| | | | |
|---|---|---|---|
| CN | 101751896 | A | 6/2010 |
| CN | 102103836 | A | 6/2011 |
| CN | 102136262 | A | 7/2011 |
| CN | 102402957 | A | 4/2012 |
| CN | 103728746 | A | 4/2014 |
| KR | 10-2004-0053639 | A | 6/2004 |
| TW | I291676 | | 12/2007 |
| TW | 200844966 | | 11/2008 |
| TW | I320164 | | 2/2010 |
| TW | I406254 | B1 | 8/2013 |

* cited by examiner

CONTROL METHOD AND CONTROL DEVICE FOR CHARGING TIME SHARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a control method and control device, and more particularly, to a control method and control device capable of realizing charging time sharing.

2. Description of the Prior Art

With rapid development of display technology, traditional cathode ray tube (CRT) displays have been gradually replaced by liquid crystal displays (LCDs). A LCD device utilizes a source driver and a gate driver to drive pixels on a display panel to display images. LCD devices now have higher resolutions, and as a result data throughput between the timing controller and the source drivers has greatly increased.

In general, a respective gate driving signal is in an enable state so that a respective pixel row of a display panel is turned on and capacitors of corresponding pixels are charged to gray voltage levels by the source driver for displaying respective image data during the respective display driving period. Fixed display driving periods are usually applied for displaying the image data. For example, please refer to FIG. 1, the duration of each of the display driving periods T1-TN is 1H. However, the higher the gray level of the pixel image data is, the longer the charging time takes. The gray levels of the image data may be varied at different display driving periods. Since the duration of each display driving period is fixed, some pixels on the respective row may be charged insufficiently and unable to desire gray voltage levels, thus causing the LCD device to exhibit color inequality due to charging inequality. Thus, there is a need for improvement.

SUMMARY OF THE INVENTION

It is therefore an objective of the present invention to provide a control method and a control device capable of realizing charging time sharing purpose.

The present invention discloses a control method for charging time sharing in a display apparatus, comprising: receiving image data including a plurality of pixel data signals corresponding to a plurality of display driving periods, each display driving period associated with pixel data signals of a respective row of the display apparatus; calculating a plurality of gray variations corresponding to the plurality of display driving periods according to the plurality of pixel data signals; adjusting the plurality of display driving periods to generate a plurality of adjusted display driving periods according to the plurality of gray variations; and generating a gate clock signal according to the plurality of adjusted display driving periods.

The present invention further discloses a control device for charging time sharing, comprising: a memory unit for receiving and storing image data, the image data including a plurality of pixel data signals corresponding to a plurality of display driving periods, each display driving period associated with pixel data signals of a respective row of a display apparatus; a calculation unit for calculating a plurality of gray variations corresponding to the plurality of display driving periods according to the plurality of pixel data signals; an adjustment unit for adjusting the plurality of display driving periods to generate a plurality of adjusted display driving periods according to the plurality of gray variations; and a control signal generation unit for generating a gate clock signal according to the plurality of adjusted display driving periods.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and the claims as well, the terms "include" and "comprise" are used in an open-ended fashion, and thus should be interpreted to mean "include, but not limited to . . . ".

Figure 1:
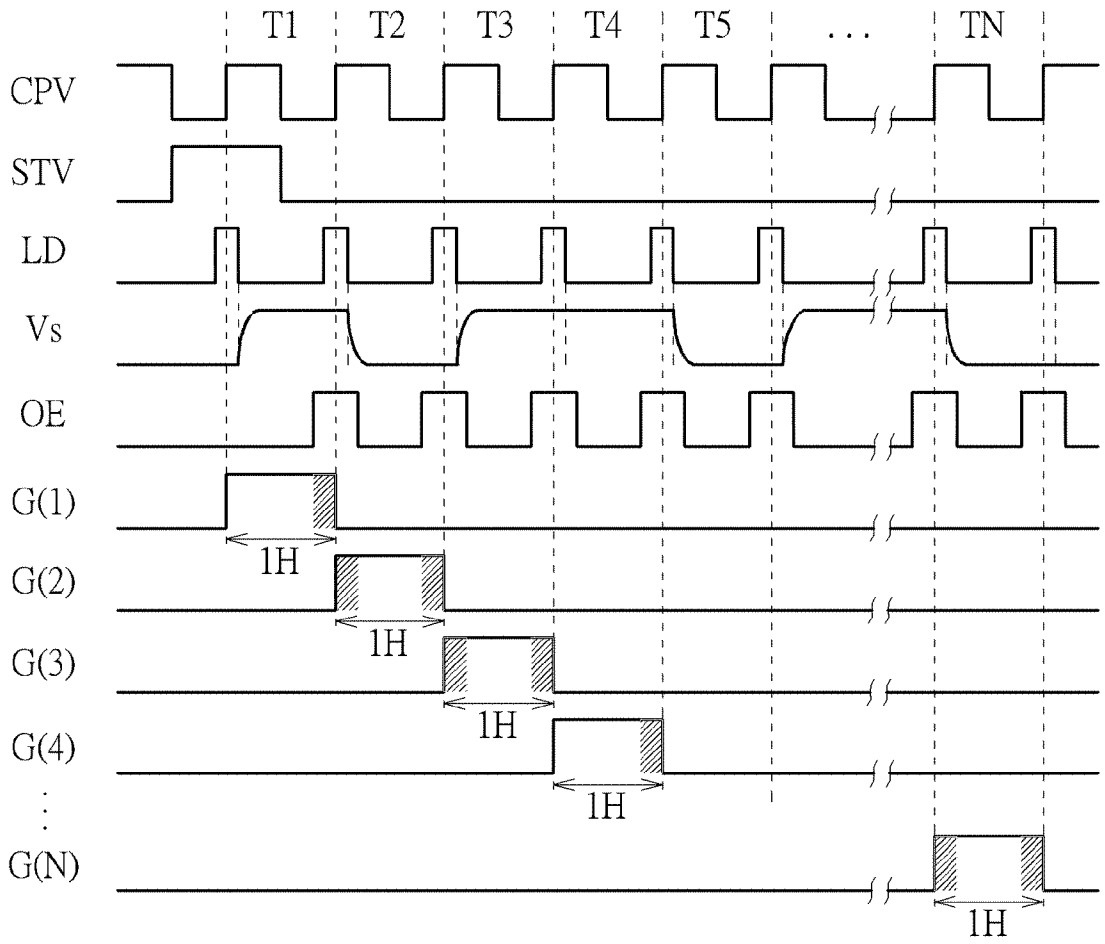
FIG. 1 PRIOR ART
FIG. 1 is a signal timing diagram of an LCD driving device according to the prior art.
Figure 2:
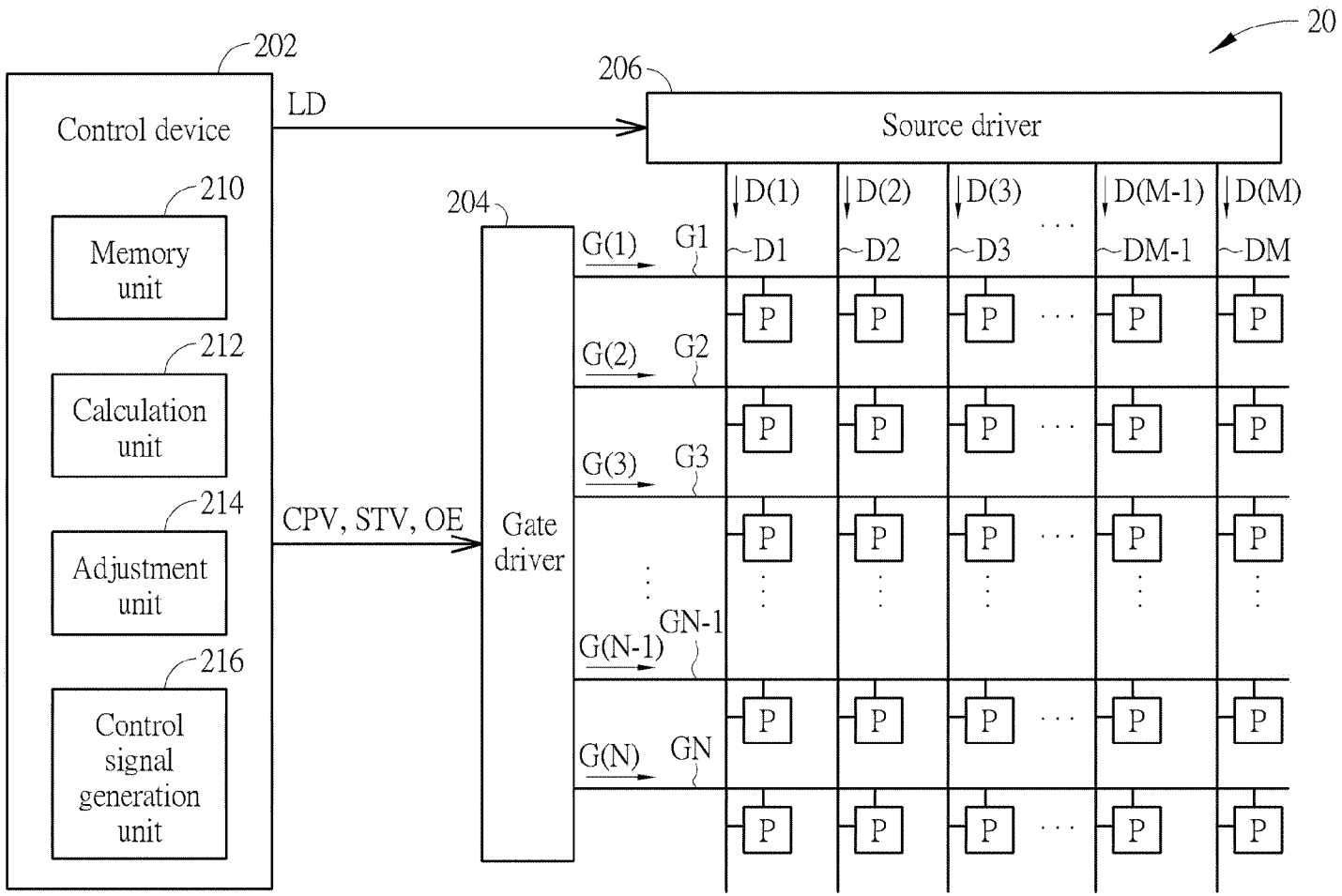
FIG. 2 is a schematic diagram of a display apparatus according to an embodiment of the invention.

Please refer to FIG. 2, which is a schematic diagram of a display apparatus 20 according to an embodiment of the invention. The display apparatus 20 includes a control device 202, a gate driver 204, a source driver 206, a display panel 208, data lines D1-DM and gate lines G1-GN. The display panel 208 includes M by N pixels P arranged in a matrix pattern. The data lines D1-DM and the gate lines G1-GN are utilized for applying signals to the pixels P. The gate driver 204 provides gate driving signals G(1)-G(N) to the gate lines G1-GN to turn on respective pixel rows. The source driver 206 provides data driving signals D(1)-D(M) to the data lines D1-DM. For example, the data driving signals D(1)-D(M) are provided to the pixels connected to the respective turned-on pixel row during a respective driving period.

The control device 202 includes a memory unit 210, a calculation unit 212, an adjustment unit 214 and a control signal generation unit 216. The memory unit 210 is utilized for receiving and storing image data. The image data includes a plurality of pixel data signals corresponding to display driving periods T1-TN. Each display driving period associates with pixel data signals of a respective row of the display panel 208. The calculation unit 212 is utilized for calculating a plurality of gray variations corresponding to the display driving periods T1-TN according to the plurality of pixel data signals. The adjustment unit 214 is utilized for adjusting the display driving periods T1-TN to generate adjusted display driving periods T1'-TN' according to the plurality of gray variations. The control signal generation unit 216 is utilized for generating a gate clock signal CPV according to the adjusted display driving periods T1'-TN'.

For calculating each gray variation corresponding to a respective display driving period, the calculation unit 212 may calculate variations of gray level of pixel data signals associated with the respective display driving period and the pixel data signals associated with a previous display driving period prior to the respective display driving period. In an embodiment, the calculation unit 212 calculates a maximum change of gray voltage levels between the respective pixel data signals corresponding to the respective display driving period and the respective pixel data signals corresponding to a previous display driving period prior to the respective display driving period, to obtain a respective gray variation corresponding to the respective display driving period.

For example, the plurality of gray variations corresponding to the display driving periods T1-TN may be calculated by the calculation unit 212 according to the following equations:

$$Vs(Tn)=Max\{\Delta[Xm(Tn-1)\rightarrow Xm(Tn)],\ m=1,\ldots,M\},n=1,\ldots,N \quad (1)$$

In equation (1), Vs(Tn) represents n-th gray variation corresponding to n-th display driving period, Tn represents n-th display driving period, Tn−1 represents a previous display driving period prior to the n-th display driving period, Xm(Tn−1) represents a respective gray voltage level of a respective pixel data signal of m-th column of the display panel 208 corresponding to a previous display driving period prior to the n-th display driving period, Xm(Tn) represents a respective gray voltage level of a respective pixel data signal of m-th column of the display panel 208 corresponding to the n-th display driving period. In equation (1), Δ(•) is a delta function indicating the difference between respective gray voltage levels, and Δ[Xm(Tn−1)→Xm(Tn)] represents the amount of change between the respective gray voltage levels of the respective pixel data signals of m-th column of the display panel 208 corresponding to the n-th display driving period and the previous display driving period prior to the n-th display driving period. In an embodiment. Δ[Xm(Tn−1)→Xm(Tn)] may be obtained by calculating an absolute difference of the respective gray voltage level of a respective pixel data signal of m-th column of the display panel 208 corresponding to a previous display driving period prior to the n-th display driving period and the respective gray voltage level of a respective pixel data signal of m-th column of the display panel 208 corresponding to the n-th display driving period. In an embodiment, Δ[Xm(Tn−1)→Xm(Tn)] may be obtained by calculating a difference value of the respective gray voltage level of a respective pixel data signal of m-th column of the display panel 208 corresponding to a previous display driving period prior to the n-th display driving period and the respective gray voltage level of a respective pixel data signal of m-th column of the display panel 208 corresponding to the n-th display driving period.

Max(•) is a function indicating taking a maximum of the value in the following parentheses. Max{Δ[Xm(Tn−1)→Xm(Tn)]} represents a maximum value of gray voltage level change corresponding to the n-th display driving period and a previous display driving period prior to the n-th display driving period among M columns of the display panel 208.

Moreover, the adjustment unit 214 adjusts the display driving periods T1-TN to generate the adjusted display driving periods T1'-TN' according to the calculated gray variations. That is, the display driving periods T1-TN can be reallocated to the adjusted display driving periods T1'-TN' according to the gray variations. In an embodiment, the adjustment unit 214 may adjust the plurality of display driving periods T1-TN to generate the plurality of adjusted display driving periods T1'-TN' according to a ratio of the plurality of gray variations. In an embodiment, for two adjacent display driving periods, the calculation unit 212 calculates a first gray variation corresponding to a first display driving period according to the pixel data signals associated with the first display driving period and the pixel data signals associated with a display driving period prior to the first display driving period. The calculation unit 212 calculates a second gray variation corresponding to a second display driving period according to the pixel data signals associated with the second display driving period and the pixel data signals associated with the first display driving period prior to the second display driving period. As such, the adjustment unit 214 compares the first gray variation with the second gray variation. When the first gray variation is greater than the second gray variation, the adjustment unit 214 adjusts the first display driving period to generate an adjusted first display driving period and adjusts the second display driving period to generate an adjusted second display driving period. For example, the adjustment unit 214 increases the first display driving period to generate an adjusted first display driving period and decreases the second display driving period to generate an adjusted second display driving period. Therefore, the first display driving period is shorter than the adjusted first display driving period and the second display driving period is longer than the adjusted second display driving period after adjustment. For example, a ratio of the adjusted first display driving period and adjusted second display driving period is substantially equal to a ratio of the first gray variation and the second gray variation. Since the adjusted first display driving period is longer than the first display driving period, the pixel data signals associated with the first display driving period has longer charging time for realizing respective pixel gray level.

In addition, when the first gray variation is smaller than or equal to the second gray variation, the adjustment unit 214 may maintains the first display driving period and provides the first display driving period as an adjusted first display driving period. Similarly, the adjustment unit 214 maintains the second display driving period and provides the second display driving period as an adjusted second display driving period.

The control signal generation unit 216 generates a gate clock signal CPV according to the adjusted display driving periods T1'-TN' and provides the gate clock signal CPV to the gate driver 204. Each period of the gate clock signal CPV corresponds to a respective adjusted display driving period of the adjusted display driving periods T1'-TN'. For example, each period of the gate clock signal CPV has the same length as the respective adjusted display driving period. The control signal generation unit 216 generates a start signal STV according to the gate clock signal CPV. The start signal STV is utilized for indicating when to start outputting the gate driving signals G(1)-G(N). The control signal generation unit 216 generates an output enable signal OE corresponding to the adjusted display driving periods T1'-TN' according to the gate clock signal CPV. The output enable signal OE is utilized for indicating when to output the gate driving signals G(1)-G(N) and the durations of the gate driving signals G(1)-G(N). Each period of the output enable signal OE the gate clock signal CPV corresponds to a respective period of the gate clock signal CPV. Therefore, the gate driver 204 generates the gate driving signals G(1)-G(N) according to at least one of the gate clock signal CPV, the start signal STV and the output enable signal OE. Each period of the gate driving signal corresponds to one respective adjusted display driving period.

The control signal generation unit 216 generates a latch data signal LD corresponding to the adjusted display driving periods T1'-TN' according to the gate clock signal CPV and provides the latch data signal LD to the source driver 206. Each period of the latch data signal LD corresponds to a respective adjusted display driving period of the adjusted display driving periods T1'-TN'. For example, each falling edge of the latch data signal LD corresponds to a respective adjusted display driving period. The latch data signal LD is utilized for indicating data reception and data output for the source driver 206. The source driver 206 generates the data driving signals D(1)-D(M) according to latch data signal LD.

In other words, since the adjusted display driving periods T1'-TN' are generated according to the gray variations of corresponding pixel data signals and the gate driving signals G(1)-G(N) and the data driving signals D(1)-D(M) are generated based on the adjusted display driving periods T1'-TN', the pixel data signals requiring longer charging time can be displays in a longer display driving period, so as to provide sufficient charging time for display.

Figure 3:
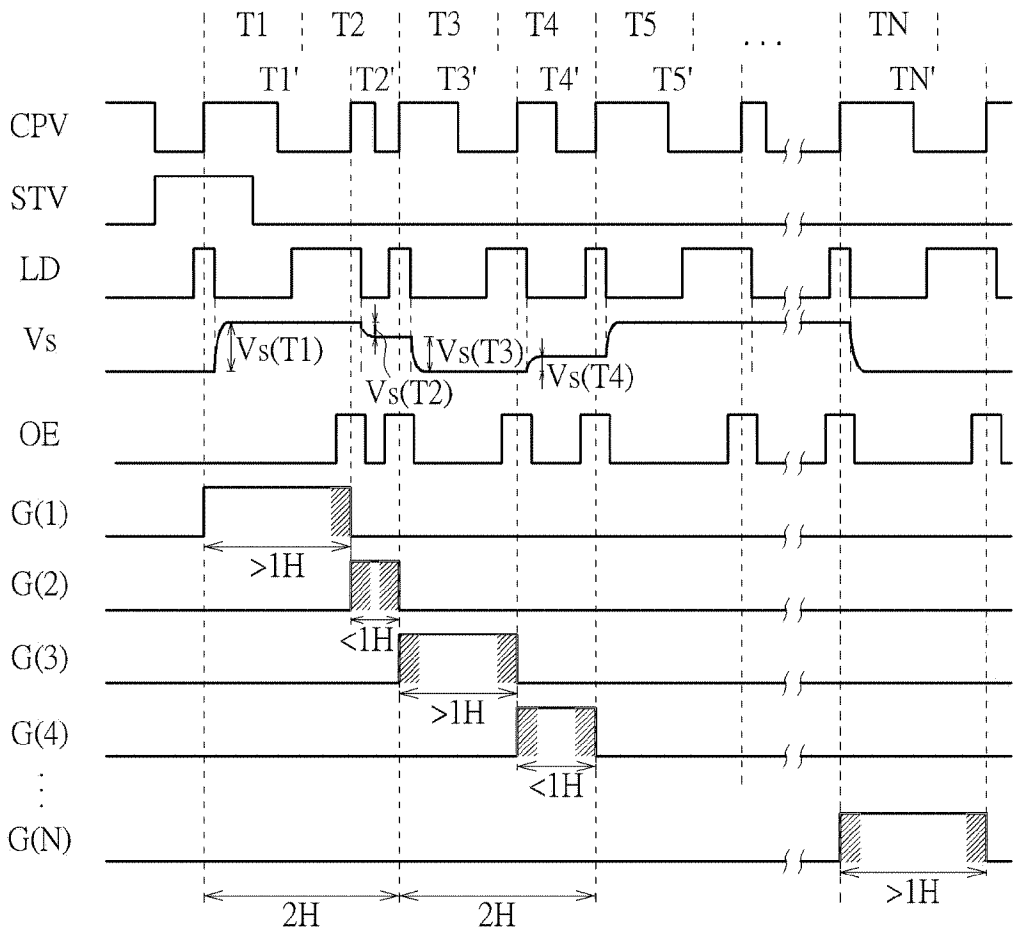
FIGS. 3-4 are signal timing diagrams of alternative embodiments of the display apparatus shown in FIG. 2.

Please refer to FIG. 3, which is a signal timing diagram of the display apparatus 20 shown in FIG. 2. Sequentially from the top of FIG. 3, the signal waveforms are: the gate clock signal CPV, the start signal STV, the latch data signal LD, the gray variations Vs, the output enable signal OE and the gate driving signals G(1)-G(N). Taking charging time sharing of two adjacent display driving periods T3 and T4 for example, suppose the duration of each of the display driving periods T1-TN is 1H before adjustment. For example, a gray variation Vs(T3) corresponding to the display driving period T3 and a gray variation Vs(T4) corresponding to the display driving period T4 can be calculated by the calculation unit 212 according to the following equations:

$$Vs(T3)=Max\{\Delta[Xm(T2)\rightarrow Xm(T3)],m=1,\ldots,M\} \quad (2)$$

$$Vs(T4)=Max\{\Delta[Xm(T3)\rightarrow Xm(T4)],m=1,\ldots,M\} \quad (3)$$

When the gray variation Vs(T3) is greater than the gray variation Vs(T4), the adjustment unit 214 increases the display driving period T3 to generate an adjusted display driving period T3' and decreases the display driving period T4 to generate an adjusted display driving period T4'. As shown in FIG. 3, the display driving period T3 is shorter than the adjusted display driving period T3'. The display driving period T4 is longer than the adjusted display driving period T4'. The total duration (i.e. 2H) of the display driving period T3 and the display driving period T4 is equal to the total duration (i.e. 2H) of the adjusted display driving period T3' and the adjusted display driving period T4'. As shown in FIG. 3, the charging orders are gate lines G1→G2→G3→G4→ . . . . The gate driving signal G(1) is outputted during the adjusted display driving period T1' to turn on the pixels of the first row of the display panel 208. Pixel data signals of the first row of the image data are displayed on the first row of the display panel 208 during the adjusted display driving period T1'. The gate driving signal G(2) is outputted during the adjusted display driving period T2' to turn on the pixels of the second row of the display panel 208. Pixel data signals of the second row of the image data are displayed on the second row of the display panel 208 during the adjusted display driving period T2'. Such like this, the gate driving signals G(3) and G(4) are sequentially outputted during the adjusted display driving periods T3' and T4' to turn on the pixels of the third row and the fourth row of the display panel 208. Pixel data signals of the third row and the fourth row of the image data are displayed on the third row and the fourth row of the display panel 208 during the adjusted display driving periods T3' and T4'.

In addition, please further refer to FIG. 3, each falling edge of the latch data signal LD corresponds to the end of a respective adjusted display driving period. The interval of time between each two adjacent rising edges of the latch data signal LD is 1H, so that data reception timing of the source driver 206 may maintain the same state without change.

Figure 4:
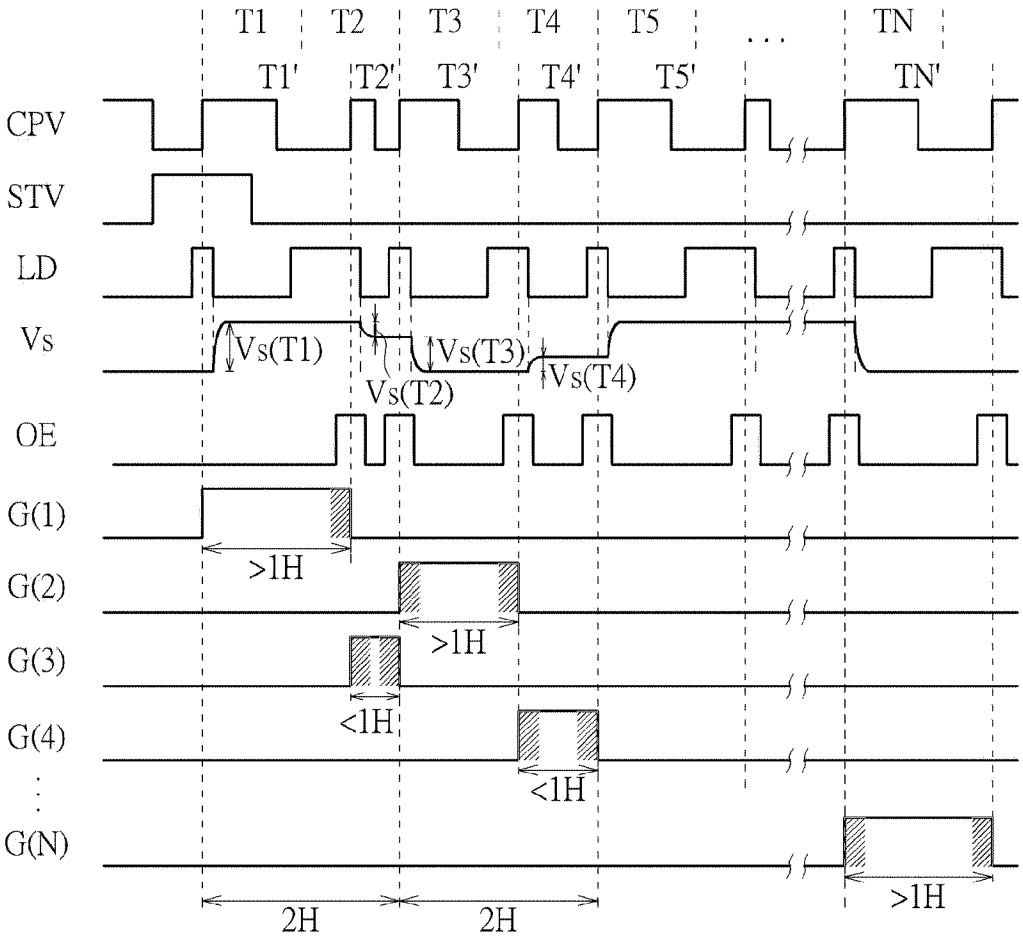

Please refer to FIG. 4, which is a signal timing diagram of an alternative embodiment of the display apparatus 20 shown in FIG. 2. Different from FIG. 3, the charging orders are gate lines G1→G3→G2→G4→ . . . . Sequentially from the top of FIG. 4, the signal waveforms are: the gate clock signal CPV, the start signal STV, the latch data signal LD, the gray variations Vs, the output enable signal OE and the gate driving signals G(1)-G(N). Taking charging time sharing of two adjacent display driving periods T3 and T4 for example, suppose the duration of each of the display driving periods T1-TN is 1H before adjustment. Similarly, a gray variation Vs(T3) corresponding to the display driving period T3 and a gray variation Vs(T4) corresponding to the display driving period T4 can be calculated by the calculation unit 212 according to the above equations (2) and equations (3). When the gray variation Vs(T3) is greater than the gray variation Vs(T4), the adjustment unit 214 increases the display driving period T3 to generate an adjusted display driving period T3' and decreases the display driving period T4 to generate an adjusted display driving period T4'. As shown in FIG. 4, the display driving period T3 is shorter than the adjusted display driving period T3'. The display driving period T4 is longer than the adjusted display driving period T4'. Therefore, the gate driving signal G(1) is outputted during the adjusted display driving period T1' to turn on the pixels of the first row of the display panel 208. Pixel data signals of the first row of the image data are displayed on the first row of the display panel 208 during the adjusted display driving period T1'. The gate driving signal G(3) is outputted during the adjusted display driving period T2' to turn on the pixels of the third row of the display panel 208. Pixel data signals of the third row of the image data are displayed on the third row of the display panel 208 during the adjusted display driving period T2'. Such like this, the gate driving signals G(2) and G(4) are sequentially outputted during the adjusted display driving periods T3' and T4' to turn on the pixels of the second row and the fourth row of the display panel 208. Pixel data signals of the second row and the fourth row of the image data are displayed on the second row and the fourth row of the display panel 208 during the adjusted display driving periods T3' and T4'.

Figure 5:
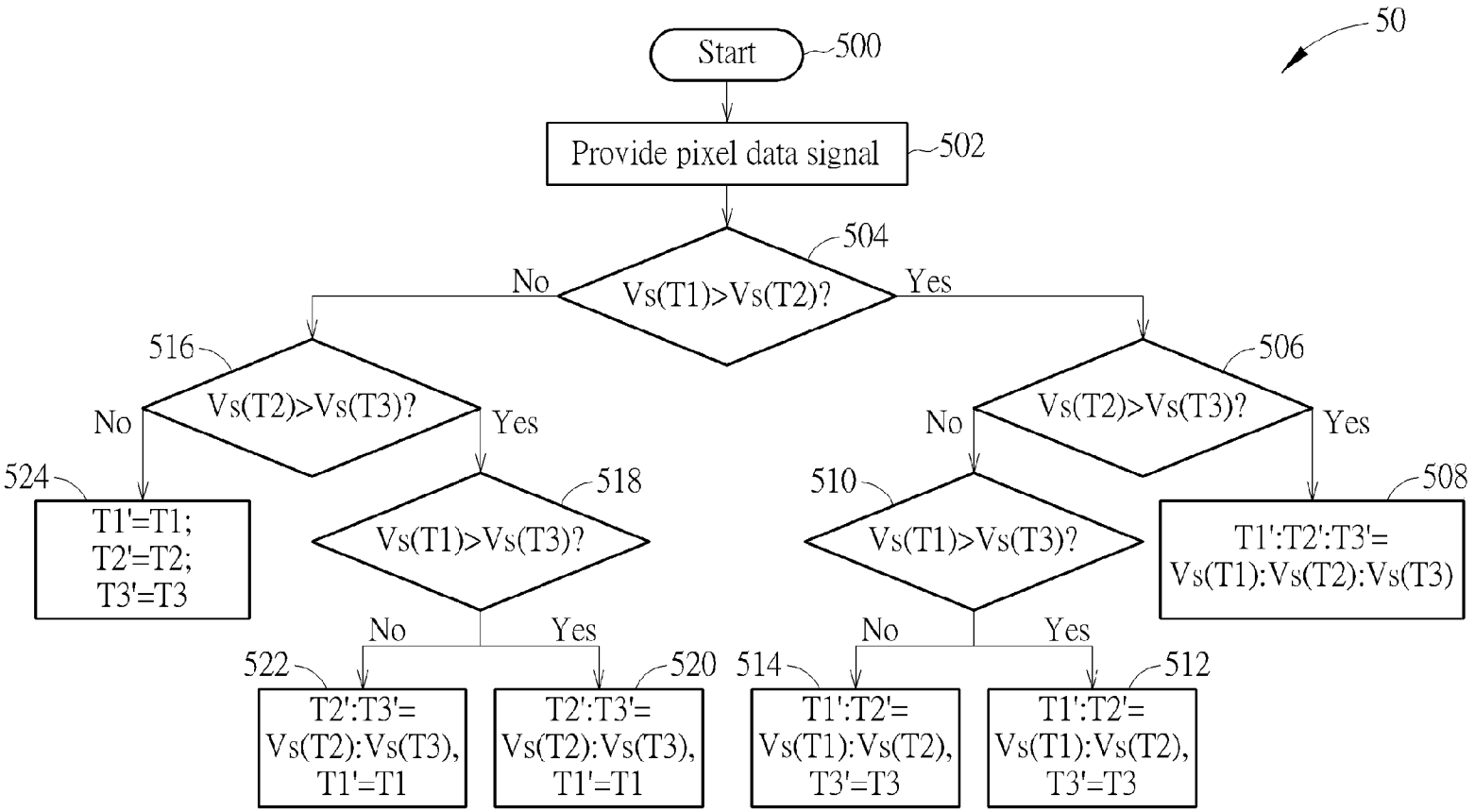
FIG. 5 is a flow diagram of a procedure according to an exemplary embodiment of the present invention.

In an embodiment, taking the charging time sharing for every three adjacent display driving periods for example, please refer to FIG. 5. FIG. 5 is a flow diagram of a procedure 50 according to an exemplary embodiment of the present invention. The procedure 50 in FIG. 5 can be applied to the embodiments shown in FIG. 2. The procedure 50 includes the following steps:

Step 500: Start.

Step 502: Provide pixel data signal.

Step 504: Determine whether gray variation Vs(T1) is greater than gray variation Vs(T2); if gray variation Vs(T1) is greater than gray variation Vs(T2), go to Step 506, if gray variation Vs(T1) is smaller than gray variation Vs(T2), go to Step 516.

Step 506: Determine whether gray variation Vs(T2) is greater than gray variation Vs(T3); if gray variation Vs(T2) is greater than gray variation Vs(T3), go to Step 508, if gray variation Vs(T2) is smaller than gray variation Vs(T3), go to Step 510.

Step 508: Generate the adjusted display driving periods T1', T2', T3'; T1':T2':T3'=Vs(T1):Vs(T2):Vs(T3).

Step 510: Determine whether gray variation Vs(T1) is greater than gray variation Vs(T3); if gray variation Vs(T1) is greater than gray variation Vs(T3), go to Step 512, if gray variation Vs(T1) is smaller than gray variation Vs(T3), go to Step 514.

Step 512: Generate the adjusted display driving periods T1', T2', T3'; T1':T2'=Vs(T1):Vs(T2), T3'=T3.

Step 514: Generate the adjusted display driving periods T1', T2', T3'; T1':T2'=Vs(T1):Vs(T2), T3'=T3.

Step 516: Determine whether gray variation Vs(T2) is greater than gray variation Vs(T3); if gray variation Vs(T2) is greater than gray variation Vs(T3), go to Step 518, if gray variation Vs(T2) is smaller than gray variation Vs(T3), go to Step 524.

Step 518: Determine whether gray variation Vs(T1) is greater than gray variation Vs(T3); if gray variation Vs(T1) is greater than gray variation Vs(T3), go to Step 520, if gray variation Vs(T1) is smaller than gray variation Vs(T3), go to Step 522.

Step 520: Generate the adjusted display driving periods T1', T2', T3'; T2':T3'=Vs(T2):Vs(T3), T1'=T1.

Step 522: Generate the adjusted display driving periods T1', T2', T3'; T2':T3'=Vs(T2):Vs(T3), T1'=T1.

Step 524: Generate the adjusted display driving periods T1', T2', T3';T1+=T1, T2'=T2, T3'=T3.

According to the procedure 50, in Step 502, pixel data signals of rows of the display panel 208 corresponding to display driving periods T1-TN are provided. The calculation unit 212 calculates gray variations Vs(T1), Vs(T2) and Vs(T3) corresponding to display driving periods T1, T2, T3 according to the above-mentioned equation (1).

In Step 504, the adjustment unit 214 determines whether the gray variation Vs(T1) is greater than the gray variation Vs(T2). If the gray variation Vs(T1) is greater than the gray variation Vs(T2), the adjustment unit 214 further determines whether the gray variation Vs(T2) is greater than the gray variation Vs(T3) (Step 506). If the gray variation Vs(T2) is greater than the gray variation Vs(T3) (i.e. Vs(T1)> Vs(T2)>Vs(T3)), this means the gray variations are progressively decreased with display driving period. Accordingly, the adjustment unit 214 adjusts the display driving periods T1, T2, T3 according to the gray variation Vs(T1), the gray variation Vs(T2) and the gray variation Vs(T3). The display driving periods T1, T2, T3 may be adjusted to the adjusted display driving periods T1', T2', T3' respectively. For example, a ratio of the adjusted display driving periods T1', T2', T3' is substantially equal to a ratio of the gray variation Vs(T1), the gray variation Vs(T2) and the gray variation Vs(T3) (Step 508). In other words, since the display driving periods T1, T2, T3 are reallocated to the adjusted display driving periods T1', T2', T3', the pixel data signals associated with the display driving periods T1, T2, T3 would be displayed with charging time corresponding to the adjusted display driving periods T1', T2', T3'.

In Steps 512 and 514, the adjustment unit 214 generates the adjusted display driving periods T1', T2', T3'. The adjustment unit 214 may adjust the display driving periods T1, T2 according to the gray variation Vs(T1) and the gray variation Vs(T2), so as to generate the adjusted display driving periods T1', T2'. For example, a ratio of the display driving periods T1', T2' is substantially equal to a ratio of the gray variation Vs(T1) and the gray variation Vs(T2). For example, the adjustment unit 214 keeps the display driving period T3 and provides the display driving period T3 as the adjusted display driving periods T3'.

In Step 516, the adjustment unit 214 determines whether the variation Vs(T2) is greater than the gray variation Vs(T3). If the gray variation Vs(T2) is smaller than the gray variation Vs(T3) (i.e. Vs(T1)<Vs(T2)<Vs(T3)), this means the gray variations are progressively increased with display driving period. In such a situation, the adjustment unit 214 keeps the display driving periods T1, T2, T3 and provides the display driving periods T1, T2, T3 as the adjusted display driving periods T1', T2', T3' respectively (Step 524).

In Steps 520 and 522, the adjustment unit 214 generates the adjusted display driving periods T1', T2', T3'. The adjustment unit 214 adjusts the display driving periods T2, T3 according to the gray variation Vs(T2) and the gray variation Vs(T3), so as to generate the adjusted display driving periods T2', T3'. For example, a ratio of the display driving periods T2', T3' is substantially equal to a ratio of the gray variation Vs(T2) and the gray variation Vs(T3). For example, the adjustment unit 214 keeps the display driving period T1 and provides the display driving period T1 as the adjusted display driving periods T1'.

In summary, the invention can re-assign the display driving periods to provide the adjusted display driving periods based on gray variations of the display driving periods for charging time sharing. Since the gate driving signals and the data driving signals are generated based on the adjusted display driving periods, the pixel data signals requiring longer charging time can be displays in a longer display driving period, so as to provide sufficient charging time for display and avoid charging inequality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for charging time sharing in a display apparatus, comprising:

receiving image data including a plurality of pixel data signals corresponding to a plurality of display driving periods, each display driving period associated with pixel data signals of a respective row of the display apparatus;

calculating a plurality of gray variations corresponding to the plurality of display driving periods according to the plurality of pixel data signals;

adjusting the plurality of display driving periods to generate a plurality of adjusted display driving periods by comparing the plurality of gray variations; and generating a gate clock signal according to the plurality of adjusted display driving periods, wherein the plurality of adjusted display driving period comprises an adjusted first display driving period and an adjusted second display driving period, an adjusted third display driving period and an adjusted fourth display driving period occurring in order and having different durations, and a total duration of the adjusted first display driving period and the adjusted second display driving period is equal to a total duration of the adjusted third display driving period and the adjusted fourth display driving period.

2. The control method of claim 1, wherein the step of calculating a plurality of gray variations corresponding to the plurality of display driving periods according to the plurality of pixel data signals comprises:

for each gray variation corresponding to a respective display driving period, calculating a maximum change of gray voltage levels between the respective pixel data signals corresponding to the respective display driving period and the respective pixel data signals corresponding to a previous display driving period prior to the respective display driving period.

3. The control method of claim 1, wherein plurality of gray variations corresponding to the plurality of display driving periods are calculated according to the following equation:

$$Vs(Tn)=Max\{\Delta[Xm(Tn-1)\rightarrow Xm(Tn)],\ m=1,\ldots,M\},n=1,\ldots,N$$

where Vs(Tn) represents n-th gray variation corresponding to n-th display driving period; Tn represents n-th display driving period; Tn−1 represents a previous display driving period prior to the n-th display driving period; Xm(Tn−1) represents a respective gray voltage level of a respective pixel data signal of m-th column of the display apparatus corresponding to the previous display driving period prior to the n-th display driving period; Xm(Tn) represents a respective gray voltage level of a respective pixel data signal of m-th column of the display apparatus corresponding to the n-th display driving period; Δ(•) represents a delta function indicating the difference between respective gray voltage levels; Max (•) represents a function indicating taking a maximum of the value in the following parentheses; and n, N, m and M are positive integers, n is between 1 and N, m is between 1 and M.

4. The control method of claim 1, wherein the step of calculating the plurality of gray variations corresponding to the plurality of display driving periods according to the plurality of pixel data signals comprises:

calculating a first gray variation of the plurality of gray variations corresponding to a first display driving period of the plurality of display driving periods according to pixel data signals corresponding to the first display driving period and pixel data signals corresponding to a previous display driving period prior to the first display driving period; and calculating a second gray variation of the plurality of gray variations corresponding to a second display driving period of the plurality of display driving periods according to pixel data signals corresponding to the second display driving period and pixel data signals corresponding to the first display driving period, wherein the second display driving period is after the first display driving period.

5. The control method of claim 4, wherein the step of adjusting the plurality of display driving periods to generate the plurality of adjusted display driving periods by comparing the plurality of gray variations comprises:

comparing the first gray variation with the second gray variation; and when the first gray variation is greater than the second gray variation, increasing the first display driving period to generate the adjusted first display driving period and decreasing the second display driving period to generate the adjusted second display driving period.

6. The control method of claim 5, wherein the first display driving period is shorter than the adjusted first display driving period, the second display driving period is longer than the adjusted second display driving period, and the total duration of the first display driving period and the second display driving period is equal to the total duration of the adjusted first display driving period and the adjusted second display driving period.

7. The control method of claim 1, wherein the step of adjusting the plurality of display driving periods to generate the plurality of adjusted display driving periods by comparing the plurality of gray variations comprises:

adjusting the plurality of display driving periods to the plurality of adjusted display driving periods according to a ratio of the plurality of gray variations.

8. The control method of claim 1, wherein each period of the gate clock signal corresponds to a respective adjusted display driving period of the plurality of adjusted display driving periods.

9. The control method of claim 1, further comprising at least one of the following:

generating a start signal according to the gate clock signal;

generating an output enable signal corresponding to the plurality of adjusted display driving periods, wherein each period of the output enable signal corresponds to a respective adjusted display driving period of the plurality of adjusted display driving periods; and generating a latch data signal corresponding to the plurality of adjusted display driving periods, wherein each period of the latch data corresponds to a respective adjusted display driving period of the plurality of adjusted display driving periods.

10. A control device for charging time sharing, comprising:

a memory unit for receiving and storing image data, the image data including a plurality of pixel data signals corresponding to a plurality of display driving periods, each display driving period associated with pixel data signals of a respective row of a display apparatus;

a calculation unit for calculating a plurality of gray variations corresponding to the plurality of display driving periods according to the plurality of pixel data signals;

an adjustment unit for adjusting the plurality of display driving periods to generate a plurality of adjusted display driving periods by comparing the plurality of gray variations, wherein the plurality of adjusted display driving period comprises an adjusted first display driving period and an adjusted second display driving period, an adjusted third display driving period and an adjusted fourth display driving period occurring in order and having different durations, and a total duration of the adjusted first display driving period and the adjusted second display driving period is equal to a total duration of the adjusted third display driving period and the adjusted fourth display driving period; and a control signal generation unit for generating a gate clock signal according to the plurality of adjusted display driving periods.

11. The control device of claim 10, wherein for each gray variation corresponding to a respective display driving period, the calculation unit calculates a maximum change of gray voltage levels between the respective pixel data signals corresponding to the respective display driving period and the respective pixel data signals corresponding to a previous display driving period prior to the respective display driving period.

12. The control device of claim 10, wherein the plurality of gray variations corresponding to the plurality of display driving periods are calculated by the calculation unit according to the following equation:

$$Vs(Tn)=Max\{\Delta[Xm(Tn-1)\rightarrow Xm(Tn)],\ m=1,\ldots,M\},n=1,\ldots,N$$

where Vs(Tn) represents n-th gray variation corresponding to n-th display driving period; Tn represents n-th display driving period; Tn−1 represents a previous display driving period prior to the n-th display driving period; Xm(Tn−1) represents a respective gray voltage level of a respective pixel data signal of m-th column of the display apparatus corresponding to the previous display driving period prior to the n-th display driving period; Xm(Tn) represents a respective gray voltage level of a respective pixel data signal of m-th column of the display apparatus corresponding to the n-th display driving period; Δ(•) represents a delta function indicating the difference between respective gray voltage levels; Max(•) represents a function indicating taking a maximum of the value in the following parentheses; and n, N, m and M are positive integers, n is between 1 and N, m is between 1 and M.

13. The control device of claim 10, wherein the calculation unit calculates a first gray variation of the plurality of gray variations corresponding to a first display driving period of the plurality of display driving periods according to pixel data signals corresponding to the first display driving period and pixel data signals corresponding to a previous display driving period prior to the first display driving period and calculates a second gray variation of the plurality of gray variations corresponding to a second display driving period of the plurality of display driving periods according to pixel data signals corresponding to the second display driving period and pixel data signals corresponding to the first display driving period, wherein the second display driving period is after the first display driving period.

14. The control device of claim 13, wherein the adjustment unit compares the first gray variation with the second gray variation, when the first gray variation is greater than the second gray variation, the adjustment unit increases the first display driving period to generate the adjusted first display driving period and the adjustment unit decreases the second display driving period to generate the adjusted second display driving period.

15. The control device of claim 14, wherein the first display driving period is shorter than the adjusted first display driving period and the second display driving period is longer than the adjusted second display driving period, and the total duration of the first display driving period and the second display driving period is equal to the total duration of the adjusted first display driving period and the adjusted second display driving period.

16. The control device of claim 10, wherein the adjustment unit adjusts the plurality of display driving periods to the plurality of adjusted display driving periods according to a ratio of the plurality of gray variations.

17. The control device of claim 10, wherein each period of the gate clock signal corresponds to a respective adjusted display driving period of the plurality of adjusted display driving periods.

18. The control device of claim 10, wherein the control signal generation unit generates at least one of a start signal, an output enable signal and a latch data signal, wherein each period of the output enable signal and the latch data signal corresponds to a respective adjusted display driving period of the plurality of adjusted display driving periods.

19. A control method for charging time sharing in a display apparatus, comprising:

receiving image data including a plurality of pixel data signals corresponding to a plurality of display driving periods, each display driving period associated with pixel data signals of a respective row of the display apparatus;

calculating a plurality of gray variations corresponding to the plurality of display driving periods according to the plurality of pixel data signals;

adjusting the plurality of display driving periods to generate a plurality of adjusted display driving periods by comparing the plurality of gray variations, comprising:

comparing a first gray variation corresponding to a first display driving period of the plurality of display driving periods with a second gray variation corresponding to a second display driving period of the plurality of display driving periods, wherein the second display driving period is neighboring to the first display driving period; and when the first gray variation is greater than the second gray variation, increasing the first display driving period to generate an adjusted first display driving period and decreasing the second display driving period to generate an adjusted second display driving period; and generating a gate clock signal according to the plurality of adjusted display driving periods.

20. A control device for charging time sharing, comprising:

a memory unit for receiving and storing image data, the image data including a plurality of pixel data signals corresponding to a plurality of display driving periods, each display driving period associated with pixel data signals of a respective row of a display apparatus;

a calculation unit for calculating a plurality of gray variations corresponding to the plurality of display driving periods according to the plurality of pixel data signals;

an adjustment unit for adjusting the plurality of display driving periods to generate a plurality of adjusted display driving periods by comparing the plurality of gray variations; and a control signal generation unit for generating a gate clock signal according to the plurality of adjusted display driving periods;

wherein the adjustment unit compares a first gray variation corresponding to a first display driving period of the plurality of display driving periods with a second gray variation corresponding to a second display driving period of the plurality of display driving periods, wherein the second display driving period is neighboring to the first display driving period, and when the first gray variation is greater than the second gray variation, the adjustment unit increases the first display driving period to generate an adjusted first display driving period and the adjustment unit decreases the second display driving period to generate an adjusted second display driving period.

[21. A control method for charging time sharing in a display apparatus, comprising:

receiving image data including a plurality of pixel data signals corresponding to a plurality of display driving periods, each display driving period associated with pixel data signals of a respective row of the display apparatus;

calculating a plurality of gray variations corresponding to the plurality of display driving periods according to the plurality of pixel data signals;

adjusting the plurality of display driving periods to generate a plurality of adjusted display driving periods according to the plurality of gray variations; and generating a gate clock signal according to the plurality of adjusted display driving periods to sequentially drive the rows of pixels of the display one row by one row, wherein in each of the adjusted display driving periods, a single row of pixels of the display panel are turned on.]

[22. A control device for charging time sharing, comprising:

a memory unit for receiving image data including a plurality of pixel data signals corresponding to a plurality of display driving periods, each display driving period associated with pixel data signals of a respective row of the display apparatus;

a calculation unit for calculating a plurality of gray variations corresponding to the plurality of display driving periods according to the plurality of pixel data signals;

an adjustment unit for adjusting the plurality of display driving periods to generate a plurality of adjusted display driving periods according to the plurality of gray variations; and a control signal generation unit for generating a gate clock signal according to the plurality of adjusted display driving periods to sequentially drive the rows of pixels of the display one row by one row, wherein in each of the adjusted display driving periods, a single row of pixels of the display panel are turned on.]

23. A control method for charging time sharing in a display apparatus, comprising:

obtaining pixel data signals of respective row of the display apparatus; and generating a plurality of adjusted display driving periods according to the plurality of pixel data signals; and wherein the plurality of adjusted display driving periods comprises an adjusted first display driving period and an adjusted second display driving period, an adjusted third display driving period and an adjusted fourth display driving period occurring in order and having different durations, and a total duration of the adjusted first display driving period and the adjusted second display driving period is equal to a total duration of the adjusted third display driving period and the adjusted fourth display driving period.

24. A control device for charging time sharing, comprising:

a memory unit for obtaining pixel data signals of respective row of the display apparatus; and an adjustment unit for generating a plurality of adjusted display driving periods according to the plurality of pixel data signals;

wherein the plurality of adjusted display driving period comprises an adjusted first display driving period and an adjusted second display driving period, an adjusted third display driving period and an adjusted fourth display driving period occurring in order and having different durations, and a total duration of the adjusted first display driving period and the adjusted second display driving period is equal to a total duration of the adjusted third display driving period and the adjusted fourth display driving period.

*25. A control method for a display apparatus, comprising:*

*generating a plurality of adjusted display driving periods according to gray variance associated with a plurality of pixel data signals, each of the adjusted display driving periods corresponding to a respective row of the display apparatus; and*

*driving the respective row of the display apparatus according to the corresponding one of the adjusted display driving periods;*

*wherein the plurality of adjusted display driving periods comprise a first group of adjusted display driving periods occurring consecutively and a second group of adjusted display driving periods occurring consecutively, the first group of adjusted display driving periods comprises an adjusted first display driving period and an adjusted second display driving period, the second group of adjusted display driving periods comprises an adjusted third display driving period and an adjusted fourth display driving period, wherein the adjusted first display driving period, the adjusted second display driving period, the adjusted third display driving period and the adjusted fourth display driving period occurring in order and having different durations, and a total duration of the adjusted first display driving period and the adjusted second display driving period is equal to a total duration of the adjusted third display driving period and the adjusted fourth display driving period, the second group of adjusted display driving periods having a same total number of adjusted display driving periods as that of the first group of adjusted display driving periods, and a total duration of the first group of adjusted display driving periods is equal to a total duration of the second group of adjusted display driving periods.*

*26. The control method of claim 25, further comprising:*

*generating a gate clock signal according to the plurality of adjusted display driving periods.*

*27. A control device of a display apparatus, comprising:*

*an adjustment unit for generating a plurality of adjusted display driving periods according to gray variance associated with a plurality of pixel data signals, each of the adjusted display driving periods corresponding to a respective row of the display apparatus; and*

*a control signal generation unit for driving the respective row of the display apparatus according to the corresponding one of the adjusted display driving periods;*

*wherein the plurality of adjusted display driving periods comprise a first group of adjusted display driving periods occurring consecutively and a second group of adjusted display driving periods occurring consecutively, the first group of adjusted display driving periods comprises an adjusted first display driving period and an adjusted second display driving period, the second group of adjusted display driving periods comprises an adjusted third display driving period and an adjusted fourth display driving period, wherein the adjusted first display driving period, the adjusted second display driving period, the adjusted third display driving period and the adjusted fourth display driving period occurring in order and having different durations, and a total duration of the adjusted first display driving period and the adjusted second display driving period is equal to a total duration of the adjusted third*

*display driving period and the adjusted fourth display driving period, the second group of adjusted display driving periods having a same total number of adjusted display driving periods as that of the first group of adjusted display driving periods, and a total duration of the first group of adjusted display driving periods is equal to a total duration of the second group of adjusted display driving periods.*

*28. The control device of claim 27, wherein the control signal generation unit generates a gate clock signal to drive the respective row of the display apparatus according to the plurality of adjusted display driving periods.*

*29. A control method for charging time sharing in a display apparatus, comprising:*

*generating a plurality of adjusted display driving periods by comparing a plurality of gray variations corresponding to the plurality of display driving periods for driving a respective row of the display apparatus, wherein the adjusted display driving periods depend upon the plurality of gray variations corresponding to the plurality of display driving periods, respectively; and wherein the plurality of gray variations comprise a first gray variation corresponding to a first display driving period of the plurality of display driving periods and a second gray variation corresponding to a second display driving period of the plurality of display driving periods, wherein the second display driving period is neighboring to the first display driving period; and*

*comparing the first gray variation corresponding to the first display driving period with the second gray variation corresponding to the second display driving period, when the first gray variation is greater than the second gray variation, increasing the first display driving period to generate an adjusted first display driving period and decreasing the second display driving period to generate an adjusted second display driving period.*

*30. The control method of claim 29, further comprising:*

*generating a gate clock signal according to the plurality of adjusted display driving periods.*

*31. A control device for charging time sharing in a display apparatus, comprising:*

*an adjustment unit for generating a plurality of adjusted display driving periods by comparing a plurality of gray variations corresponding to the plurality of display driving periods for driving a respective row of the display apparatus,*

*wherein the adjusted display driving periods depend upon a plurality of gray variations corresponding to the plurality of display driving periods, respectively; and*

*wherein the plurality of gray variations comprise a first gray variation corresponding to a first display driving period of the plurality of display driving periods and a second gray variation corresponding to a second display driving period of the plurality of display driving periods, wherein the second display driving period is neighboring to the first display driving period; and*

*wherein the adjustment unit compares the first gray variation corresponding to the first display driving period with the second gray variation corresponding to the second display driving period, when the first gray variation is greater than the second gray variation, the first display driving period is increased to generate an adjusted first display driving period by the adjustment unit and the second display driving period is decreased to generate an adjusted second display driving period by the adjustment unit.*

*32. The control device of claim 31, wherein the control signal generation unit generates a gate clock signal to drive the respective row of the display apparatus according to the plurality of adjusted display driving periods.*

* * * * *